(12) United States Patent
Gibson et al.

(10) Patent No.: US 9,638,602 B2
(45) Date of Patent: May 2, 2017

(54) VIBRATION TEST METHODOLOGY USING AN ELECTROMAGNET AND RELATED APPARATUS AND AUTOMATED TESTING SYSTEM WITH MATERIAL HANDLING ROBOT

(71) Applicant: Raytheon Company, Waltham, MA (US)

(72) Inventors: Joshua M. Gibson, Sahuarita, AZ (US); Nicholas C. Hansen, Sahuarita, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 126 days.

(21) Appl. No.: 14/682,424

(22) Filed: Apr. 9, 2015

(65) Prior Publication Data
US 2016/0299032 A1    Oct. 13, 2016

(51) Int. Cl.
*G01M 7/02* (2006.01)

(52) U.S. Cl.
CPC ............ *G01M 7/022* (2013.01); *G01M 7/027* (2013.01)

(58) Field of Classification Search
CPC .............................. G01M 7/027; G01M 7/022

USPC .......................................................... 73/663
See application file for complete search history.

(56) References Cited

U.S. PATENT DOCUMENTS

| 5,024,096 | A | 6/1991 | Gregory et al. |
| 5,544,528 | A | 8/1996 | Woyski et al. |
| 6,247,366 | B1 * | 6/2001 | Porter .................... G01M 7/02 73/663 |
| 8,544,332 | B2 * | 10/2013 | Chiu ....................... B06B 1/045 73/663 |
| 8,714,859 | B2 | 5/2014 | Munger |

* cited by examiner

*Primary Examiner* — John Chapman, Jr.

(57) ABSTRACT

A system includes a vibration test system and a test fixture. The vibration test system includes a slip table, and the vibration test system is configured to vibrate the slip table. The slip table includes an electromagnet. The test fixture is configured to receive at least one article to be subjected to vibration testing. At least part of the test fixture is configured to be magnetically attracted to the electromagnet in order to secure the test fixture to the electromagnet. The system may also include a material handling robot configured to lift and move the test fixture and multiple testing stations configured to perform tests on the at least one article, where the material handling robot is configured to move the test fixture to and from each of the testing stations.

21 Claims, 11 Drawing Sheets

VIBRATION TEST METHODOLOGY USING AN ELECTROMAGNET AND RELATED APPARATUS AND AUTOMATED TESTING SYSTEM WITH MATERIAL HANDLING ROBOT

TECHNICAL FIELD

This disclosure is generally directed to vibration testing. More specifically, this disclosure is directed to a vibration test methodology using an electromagnet and a related apparatus and automated testing system with a material handling robot.

BACKGROUND

Various types of articles are often subjected to intense vibration tests to simulate operational and environmental conditions, as well as to verify assembly and general workmanship of the articles. In a conventional vibration testing system, an article to be tested is manually mounted onto a test fixture, and the test fixture with the attached article is lifted onto an electrodynamic shaker or attached slip table of a vibration test system. The test fixture is manually bolted onto the electrodynamic shaker or attached slip table, and cables or other components (such as accelerometers) are connected to the test fixture. The vibration test system then vibrates the electrodynamic shaker or attached slip table in order to transfer energy to the test fixture with the attached article, providing vibratory stimulus to the article under test. This process can be repeated for each axis of the article under test. As can be seen here, the setup and vibration testing of multiple articles may require a lengthy manual process, which can be costly and consume a considerable amount of time during production test flow operations.

SUMMARY

This disclosure provides a vibration test methodology using an electromagnet and a related apparatus and automated testing system with a material handling robot.

In a first embodiment, a system includes a vibration test system and a test fixture. The vibration test system includes a slip table, and the vibration test system is configured to vibrate the slip table. The slip table includes an electromagnet. The test fixture is configured to receive at least one article to be subjected to vibration testing. At least part of the test fixture is configured to be magnetically attracted to the electromagnet in order to secure the test fixture to the electromagnet.

In a second embodiment, a method includes providing a test fixture to a vibration test system. The method also includes securing the test fixture to a slip table of the vibration test system using a magnetic field generated by an electromagnet of the vibration test system. The method further includes performing a vibration test of at least one article secured to the test fixture. The vibration test system imparts vibrations to the slip table to thereby impart vibrations to the test fixture and the at least one article.

In a third embodiment, a vibration test system includes an electrodynamic shaker and a slip table. The electrodynamic shaker is configured to vibrate the slip table, and the slip table is configured to impart vibrations to a test fixture that is secured to the slip table. The slip table includes an electromagnet configured to generate a magnetic field in order to secure the test fixture to the slip table.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
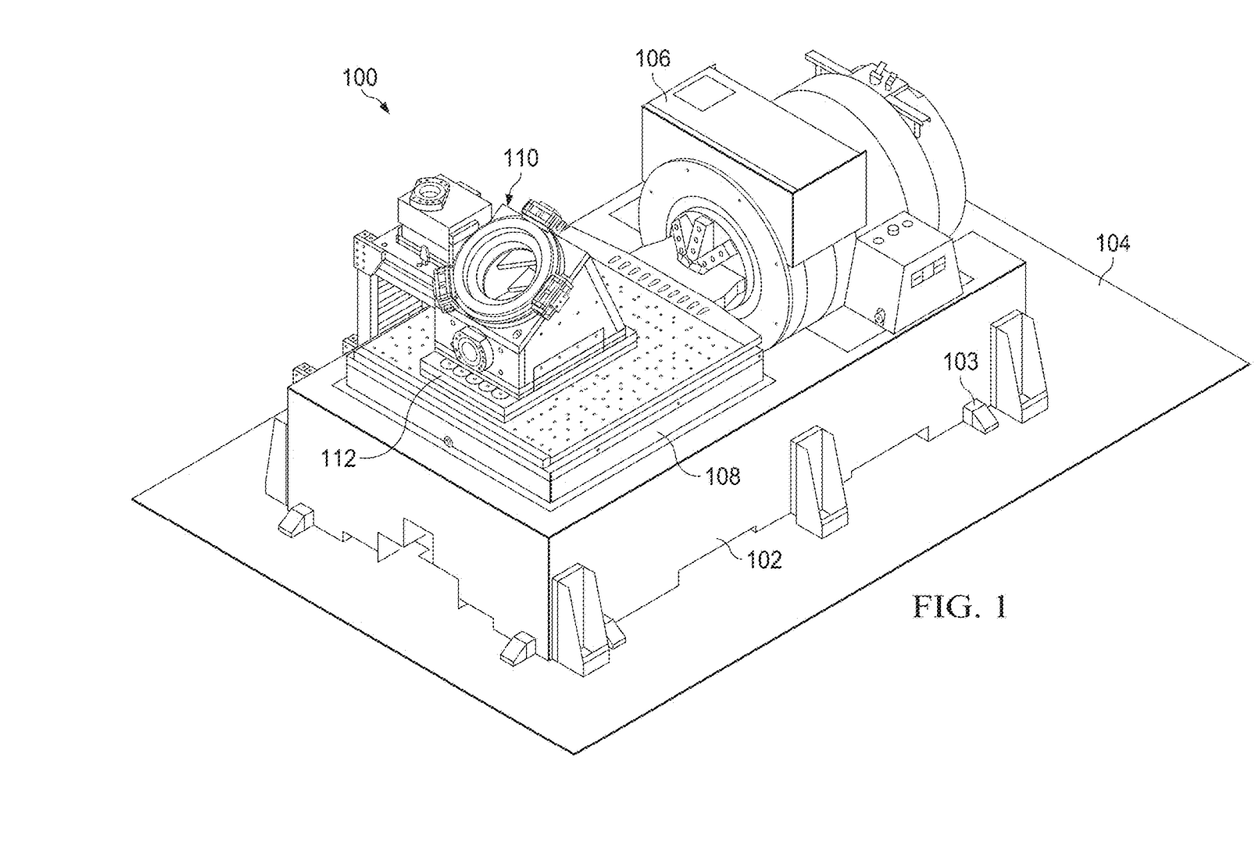
FIG. 1 illustrates an example vibration test system in accordance with this disclosure.

FIG. 1 illustrates an example vibration test system 100 in accordance with this disclosure. As shown in FIG. 1, the vibration test system 100 includes a housing 102, which allows the vibration test system 100 to be placed on or secured to a concrete floor or other support structure 104. The housing 102 denotes any suitable structure configured to encase, support, or hold other components of the vibration test system 100. The housing 102 could have any suitable size, shape, and dimensions. The housing 102 could also be formed from any suitable material(s), such as steel or other material(s) that can withstand significant repeated vibrations. In addition, the housing 102 could be coupled to the support structure 104 in any suitable manner, such as by using bolts. The housing 102 could also be isolated from the support structure 104 using an air isolation system (such as air bags). In this example, the housing 102 includes multiple restraint pads 103, which help to reduce or prevent horizontal movement of the vibration test system 100 during operation. The support structure 104 denotes any suitable structure on which the vibration test system 100 can be mounted, such as a concrete isolation pad.

The vibration test system 100 includes an electrodynamic shaker 106 and a slip table 108. The electrodynamic shaker 106 includes a coil with inner and outer poles or other component(s) capable of inducing vibrations into the slip table 108. In some embodiments, the electrodynamic shaker 106 moves the slip table 108 in one dimension (horizontally) to induce vibrations into a test fixture 110 mounted on the slip table 108. The electrodynamic shaker 106 includes any suitable structure for vibrating a slip table.

The slip table 108 denotes a structure on which the test fixture 110 is secured. In this example, the slip table 108 generally represents a flat structure free to slide (such as on bearings or an oiled granite slab) in the horizontal direction. The slip table 108 can experience any suitable vibrations created by the electrodynamic shaker 106. The slip table 108 includes any suitable structure on which at least one test fixture can be secured. The slip table 108 can also be formed from any suitable material(s), such as magnesium or aluminum.

The test fixture 110 denotes a structure used to attach, mount, or otherwise secure at least one article to be tested. The test fixture 110 could also provide one or more electrical connections with the article(s) to be tested, such as when the electrical connections are used to transport data to or from the article(s) during vibration testing. The test fixture 110 represents any suitable structure configured to secure at least one article to be tested. Various example embodiments of the test fixture 110 are described below, although any other suitable test fixtures 110 could be used with the vibration test system 100.

As noted above, in a conventional testing system, the process of placing a test fixture on a slip table, securing the test fixture in place, forming connections, and performing vibration testing on an article is very costly and time-consuming. In accordance with this disclosure, the vibration test system 100 and the test fixture 110 are designed to support automated vibration testing of articles. Among other things, the vibration test system 100 is designed to include at least one electromagnet 112. The electromagnet 112 is used to secure the test fixture 110 onto the slip table 108 and to release the test fixture 110 from the slip table 108. For example, the test fixture 110 could include a steel plate or other structure that can be magnetically secured to the electromagnet 112. By controlling the magnetic field generated by the electromagnet 112, the test fixture 110 can be rapidly coupled to and decoupled from the slip table 108 without the need for bolts or other manually-operated mechanisms. The test fixture 110 is also designed to include an interface that allows the test fixture 110 to be picked up and moved by a material handling robot or other type of automated machinery.

A "permanent" electromagnet 112 generally represents an electromagnet whose magnetic field exists unless power is supplied to the electromagnet 112, at which point the magnetic field is substantially or completely neutralized. The use of a permanent electromagnet 112 is desirable because the electromagnet 112 would retain the test fixture 110 even during a power loss at the vibration test system 100. The use of a permanent electromagnet 112 may also be desirable because permanent electromagnets can offer large clamping forces (such as up to 40,000 pounds or more) with magnetic fields that do not extend very far (such as about 0.67 inches above the surface of the electromagnet 112), helping to reduce interactions between the magnetic fields and the articles being tested. With a non-permanent electromagnet (whose magnetic field is activated only when power is supplied to the electromagnet and neutralized when power is removed), a loss of power may allow the test fixture 110 to separate from the slip table 108, which could represent a safety hazard if the slip table 108 is moving at the time of a power loss. However, the use of a non-permanent electromagnet 112 could be permitted if, for instance, other protective measures were put in place or the use of a non-permanent electromagnet is otherwise needed or desired.

The use of an electromagnet 112 for clamping and quick release of the test fixture 110 and the use of robots or other automated machinery for moving the test fixture 110 can provide various advantages depending on the implementation. For example, a system using these features can support substantially or completely automated vibration testing of articles. Moreover, such a system could provide reductions in testing times and associated operating costs. As a particular example, while a manual change of test fixtures 110 on the vibration test system 100 could take between 30 to 45 minutes, an automated process could easily be accomplished within one minute or less. This automated process would include neutralizing the magnetic field of the electromagnet 112, removing a test fixture 110 from the slip table 108, placing another test fixture 110 on the slip table 108, and energizing the magnetic field of the electromagnet 112. In addition, such a system could increase operator safety during test setup and increase test reliability by reducing human involvement and human error in the testing process.

Note that this arrangement can be used to test any suitable articles that are required or desired to undergo vibration testing. Example products can include vehicle assemblies or other automotive products (such as to simulate wear and road conditions), high production volume computer components, or sensitive military hardware. Additional details regarding the use of the electromagnet 112 with the vibration test system 100 are provided below. Also, additional details regarding the use of the vibration test system 100 with a material handling robot are provided below.

Although FIG. 1 illustrates one example of a vibration test system 100, various changes may be made to FIG. 1. For example, the sizes, shapes, and relative dimensions of the vibration test system 100 and its various components are for illustration only. In addition, the specific vibration test system 100 and the specific test fixture 110 shown in FIG. 1 are for illustration only. The functionality described in this patent document could be used with any other suitable vibration test system and/or any other suitable test fixture.

Figure 2:
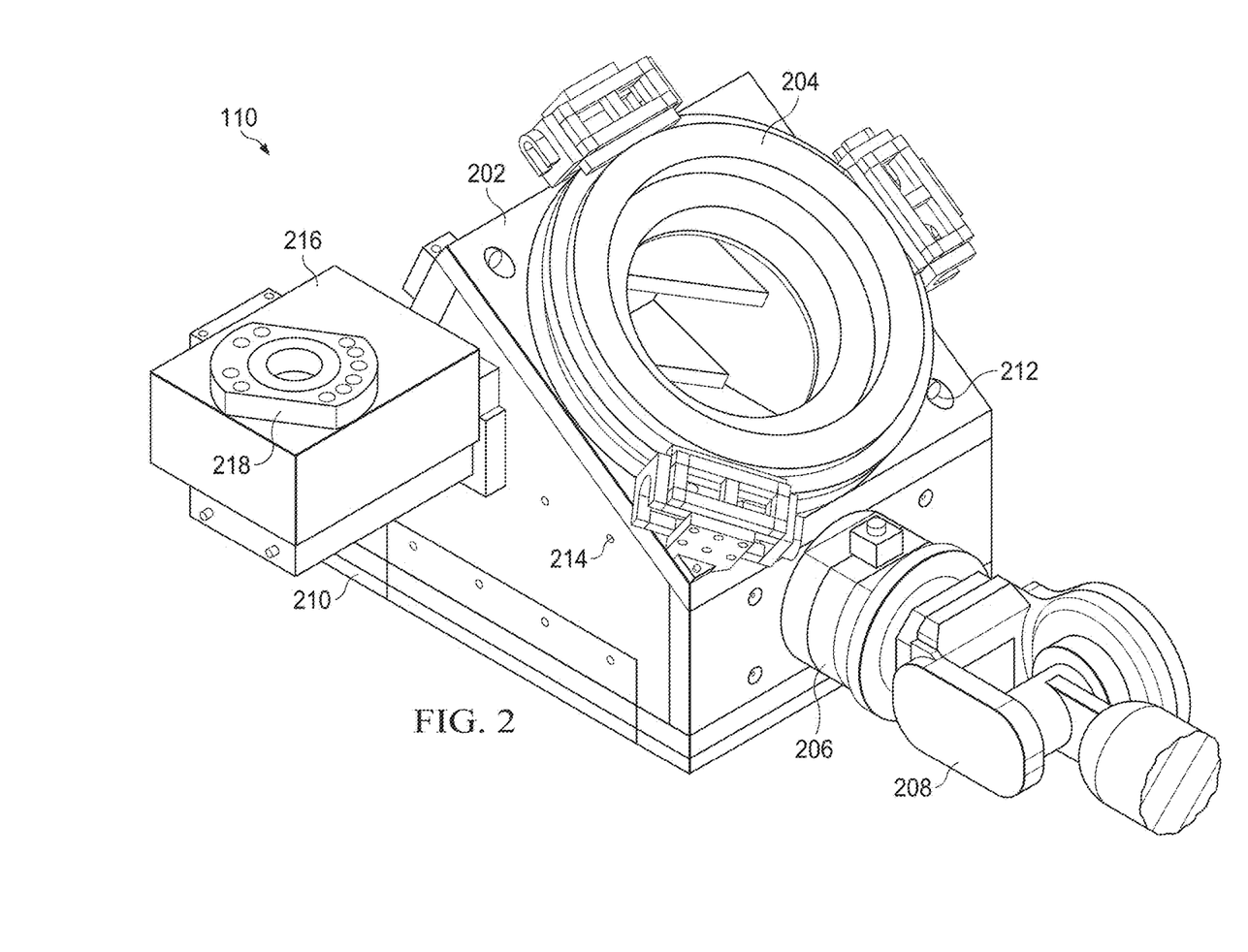
FIG. 2 illustrates a first specific example test fixture for use with an automated vibration test system in accordance with this disclosure.

FIG. 2 illustrates a first specific example test fixture 110 for use with an automated vibration test system in accordance with this disclosure. As shown in FIG. 2, the test fixture 110 includes a housing 202, which encases, supports, or holds other components of the test fixture 110. The housing 202 could have any suitable size, shape, and dimensions. The housing 202 could also be formed from any suitable material(s), such as magnesium or aluminum.

The test fixture 110 also includes a clamping ring 204, which is mounted on, in, or to the housing 202. The clamping ring 204 is designed to receive and mechanically secure at least one article to be subjected to vibration testing. The clamping ring 204 may also be used to form one or more electrical connections with the article(s) to be subjected to vibration testing. The clamping ring 204 may allow articles of different shapes to be mounted to the test fixture 110, which allows the test fixture 110 to be used to test wide varieties of products. The clamping ring 204 includes any suitable structure for receiving and retaining at least one article to be tested. One example implementation of the clamping ring 204 is described in U.S. Pat. No. 8,714,859, which is hereby incorporated by reference in its entirety.

The test fixture 110 further includes an interface 206, which is designed to allow a material handling robot or other automated machinery to pick up and move the test fixture 110. A portion of a material handling robot 208 is shown in FIG. 2 as being attached to the test fixture 110 using the interface 206. Any suitable interface 206 could be used in the test fixture 110, depending on the type or structure of the material handling robot or other automated machinery that will be used to move the test fixture 110. Note that the design of the material handling robot 208 shown in FIG. 2 is for illustration only.

A plate 210 forms or is attached to the bottom of the housing 202. The plate 210 represents a structure made of steel or other material(s) that can be attracted to and secured against the electromagnet 112 when the magnetic field of the electromagnet 112 is energized. The plate 210 could have any suitable size, shape, and dimensions. The plate 210 could also be formed from any suitable material(s) attracted to a magnetic field, such as steel or iron. Note that while shown as being separate from the housing 202, the plate 210 could form an integral part of the housing 202, such as when the bottom surface of the housing 202 is formed using the plate 210.

One or more accelerometers 212 can be attached to or used with the housing 202. The accelerometers 212 can be used in conjunction with a vibration controller to record accelerations being experienced by the test fixture 110. For example, the accelerometers 212 can record acceleration in one, two, or three dimensions depending on the make and model of the accelerometers. Measurements from the accelerometers 212 could be provided to the vibration test system 100 or to an external control system and used to verify whether desired vibrations are being created in an article under test. If not, the vibration test system 100 or the external control system could adjust the operation of the vibration test system 100 so that desired vibrations are being created in the article under test. Any suitable number(s) and type(s) of accelerometers 212 could be used in the test fixture 110.

In addition, the test fixture 110 includes a connector module 216 that supports the formation of one or more electrical connections, pneumatic connections, or other connections to external devices or systems. In this example, mounting features 214 allow the test fixture 110 to be secured to the connector module 216, which has its own interface 218 allowing the connector module 216 to be moved by a material handling robot 208 or other automated machinery. The connector module 216 can be coupled to an interconnect of the vibration test system 100 (described in more detail below) in order to supply or receive power, electrical signals, air, or other media to or from the test fixture 110. The mounting features 214 include any suitable structure(s) that allow additional components to be mounted to the test fixture 110. The connector module 216 includes any suitable structure supporting the formation of one or more connections with the test fixture 110. Note that the mounting features 214 and the connector module 216 are optional and could be omitted, or a different component could be mounted to the test fixture 110.

Figure 3A:
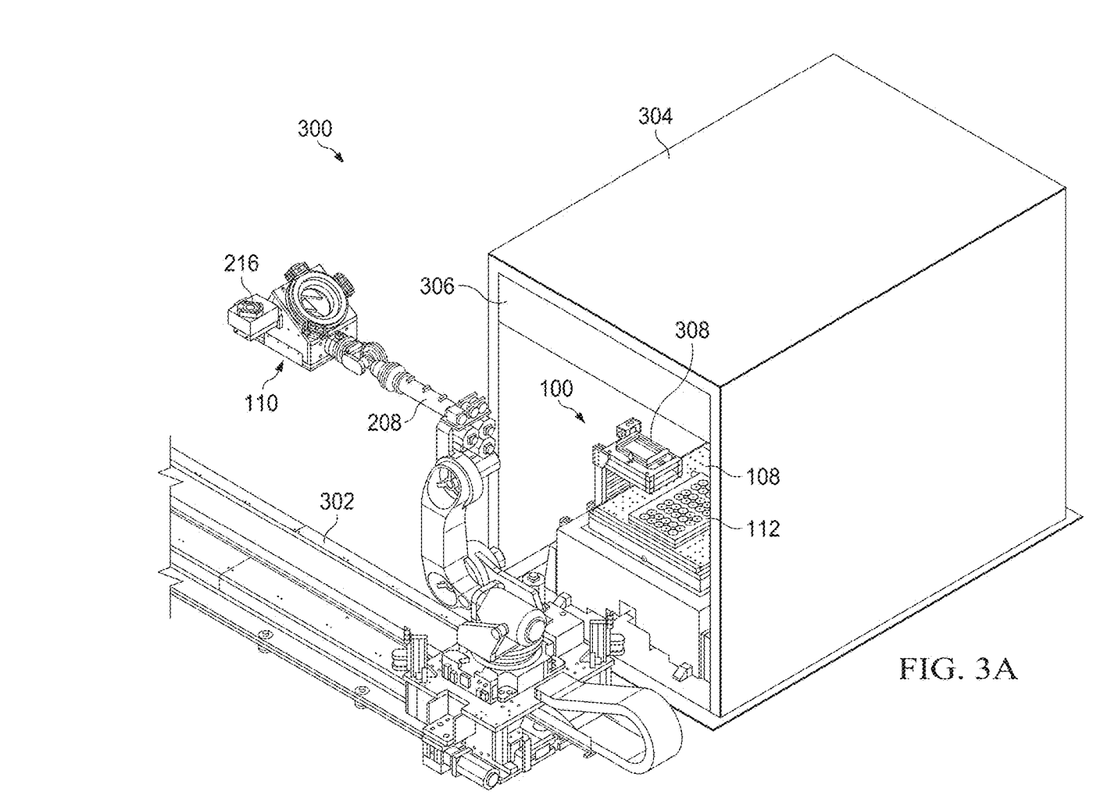
FIGS. 3A and 3B illustrate a first specific example of an automated vibration test system in accordance with this disclosure.
Figure 3B:
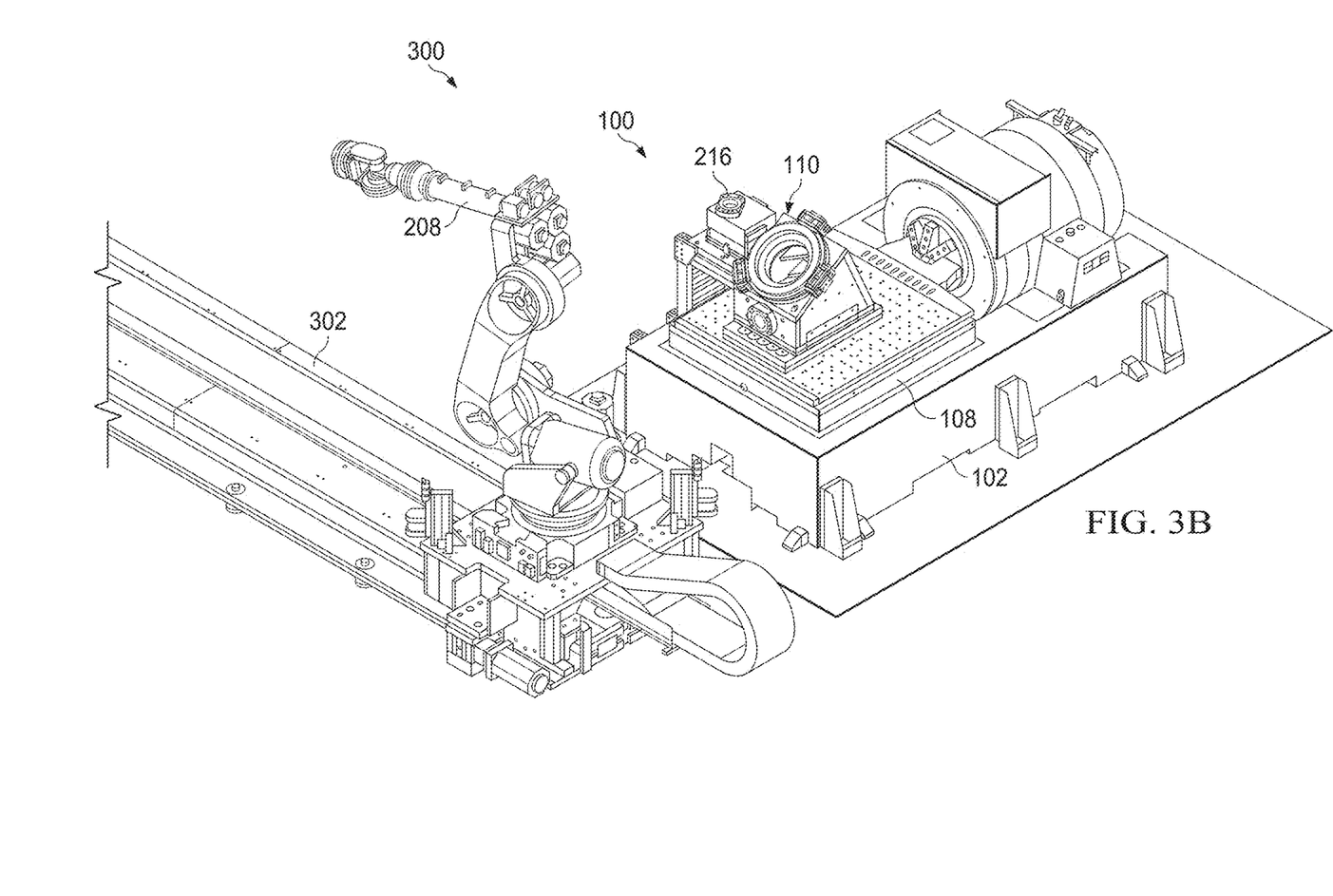

FIGS. 3A and 3B illustrate a first specific example of an automated vibration test system 300 in accordance with this disclosure. The automated vibration test system 300 here uses the test fixture 110 shown in FIG. 2 with the vibration test system 100 of FIG. 1. As shown in FIG. 3A, the automated vibration test system 300 includes the material handling robot 208, which can be used to (among other things) pick up a test fixture 110 and place the test fixture 110 onto the vibration test system 100. The material handling robot 208 moves along a track 302, which defines the path that the material handling robot 208 moves within the automated vibration test system 300. The track 302 can also be used to supply electrical power and control signals to the material handling robot 208 and possibly to transport signals from the material handling robot 208. The track 302 represents any suitable structure on which a "six degree of freedom" or other material handling robot 208 can move, such as a linear rail system. The material handling robot 208 represents any "six degree of freedom" robot or other robot that can move the test fixture 110 within the automated vibration test system 300.

The vibration test system 100 here is located within a sound abatement enclosure 304. When the vibration test system 100 is operating, a large amount of noise may be generated, and this problem increases when a facility includes multiple vibration test systems or other factory equipment. The sound abatement enclosure 304 can be closed to dampen the sound from the vibration test system 100 to a more acceptable level during operation of the vibration test system 100. In some embodiments, the sound abatement enclosure 304 includes a door 306 that can be electronically controlled (such as by a local or remote control system) so that the door 306 can be opened to allow drop-off or pick-up of a test fixture 110 by the material handling robot 208.

While not shown here, isolation air bags or other mechanisms can be used with the vibration test system 100 to help reduce or minimize the transfer of vibrations to adjacent structures. This may be needed or desired to help prevent the vibration test system 100 from negatively affecting sensitive equipment located near the vibration test system 100.

As can be seen in FIG. 3A, the vibration test system 100 also includes an interconnect 308. The interconnect 308 represents the structure and interface to external instrumentation or devices within the automated vibration test system 300. The interconnect 308 is capable of being connected to the connector module 216 to supply or receive power, electrical signals, air, or other media to or from the test fixture 110. The interconnect 308 is shown and described more fully below with reference to FIG. 6.

FIG. 3B shows the automated vibration test system 300 after the material handling robot 208 has placed the test fixture 110 onto the electromagnet 112 attached to the slip table 108, where the sound abatement enclosure 304 has been removed from FIG. 3B for convenience. Before the material handling robot 208 places the test fixture 110 onto the slip table 108, the magnetic field from the electromagnet 112 can be substantially or completely neutralized (such as via the application of an electrical current) so that the test fixture 110 can be placed into a suitable position. Once positioned, the magnetic field from the electromagnet 112 can be reactivated (such as via the removal of an electrical current) so that the test fixture 110 is held tightly in place. The material handling robot 208 can also be used to couple the connector module 216 to the interconnect 308 after the test fixture 110 is secured in place by the electromagnet 112.

Although FIG. 2 illustrates a first specific example of a test fixture 110 for use with an automated vibration test system, various changes may be made to FIG. 2. For example, the size, shape, and dimensions of the test fixture 110 are for illustration only. Also, various components could be omitted from or added to the test fixture 110 to provide needed or desired functionality. Although FIGS. 3A and 3B illustrate a first specific example of an automated vibration test system 300, various changes may be made to FIGS. 3A and 3B. For instance, the vibration test system 100 and the associated test fixture 110 could be used with any other suitable robotic or other automated machinery.

Figure 4:
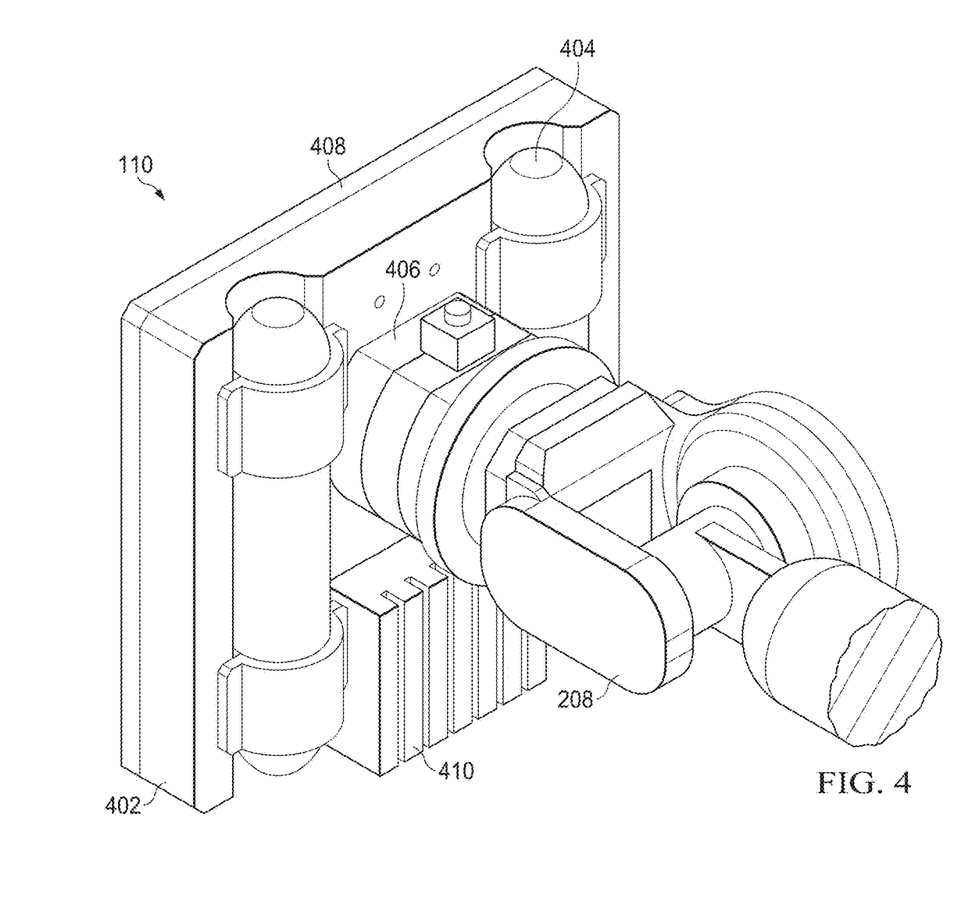
FIG. 4 illustrates a second specific example test fixture for use with an automated vibration test system in accordance with this disclosure.

FIG. 4 illustrates a second specific example test fixture 110 for use with an automated vibration test system in accordance with this disclosure. As shown in FIG. 4, the test fixture 110 includes a housing 402, which receives and holds at least one article 404 to be subjected to vibration testing. Note that the number and form of the articles 404 shown in FIG. 4 are for illustration only and that the test fixture 110 could be used to hold any number(s) and type(s) of articles. The test fixture 110 also includes an interface 406, which allows the material handling robot 208 or other automated machinery to pick up and move the test fixture 110. The test fixture 110 further includes a plate 408, which is magnetically attracted to the electromagnet 112. In addition, the test fixture 110 includes a connector interface 410, which can be coupled to the interconnect 308 in order to allow the transport of power, electrical signals, air, or other media between the automated vibration test system 300 and the test fixture 110.

Figure 5A:
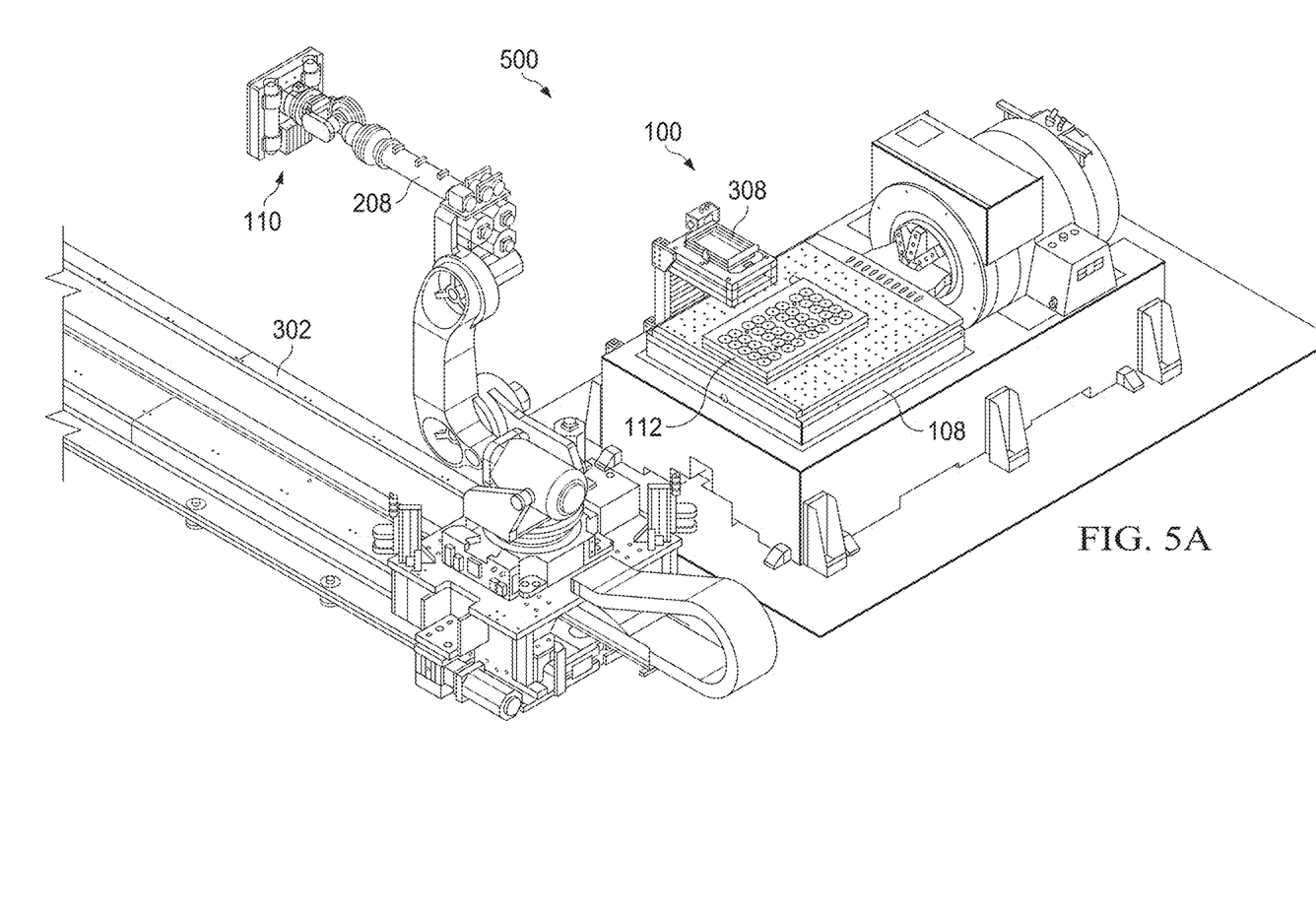
FIGS. 5A through 5C illustrate a second specific example of an automated vibration test system in accordance with this disclosure.
Figure 5B:
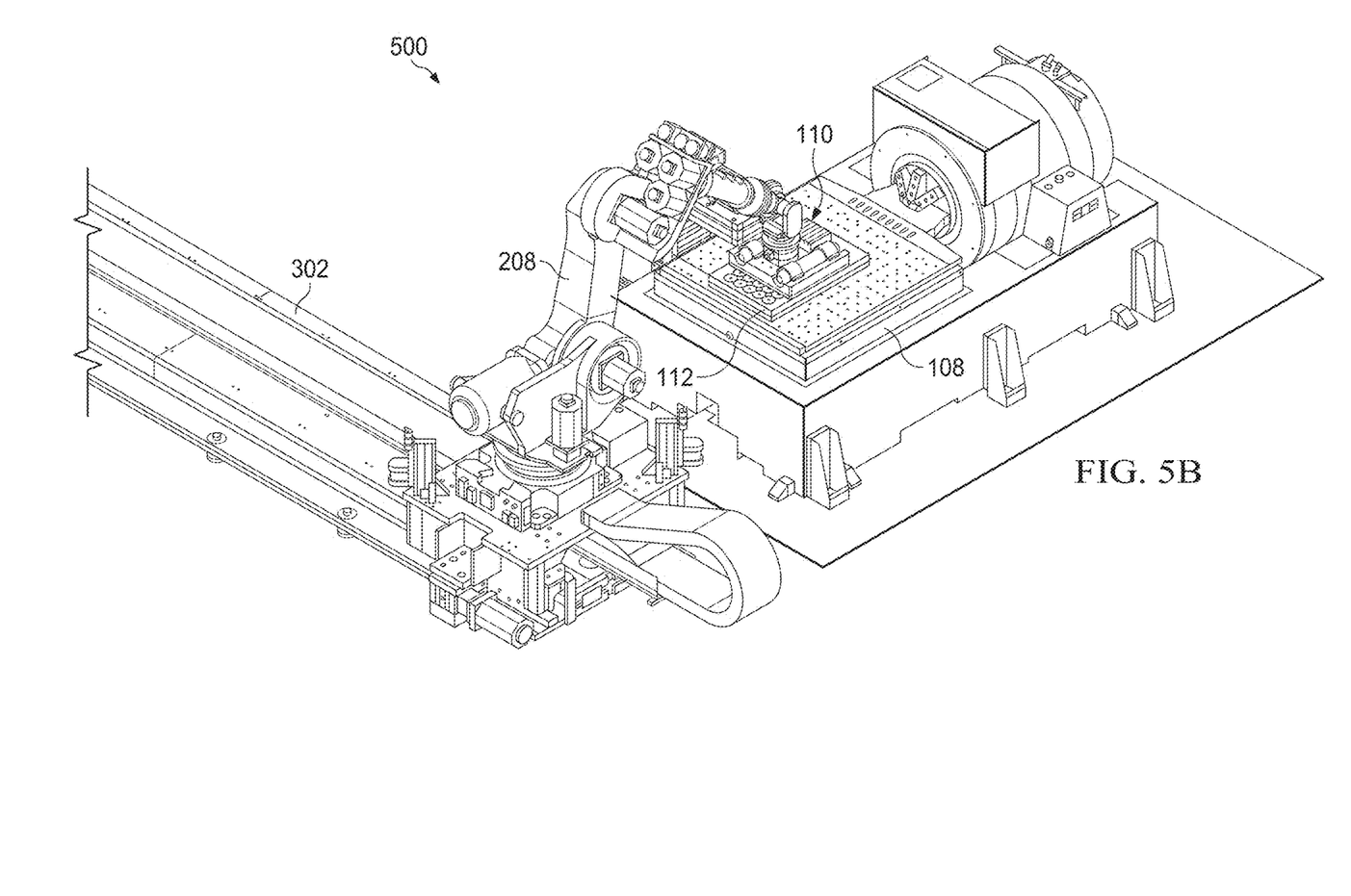
Figure 5C:
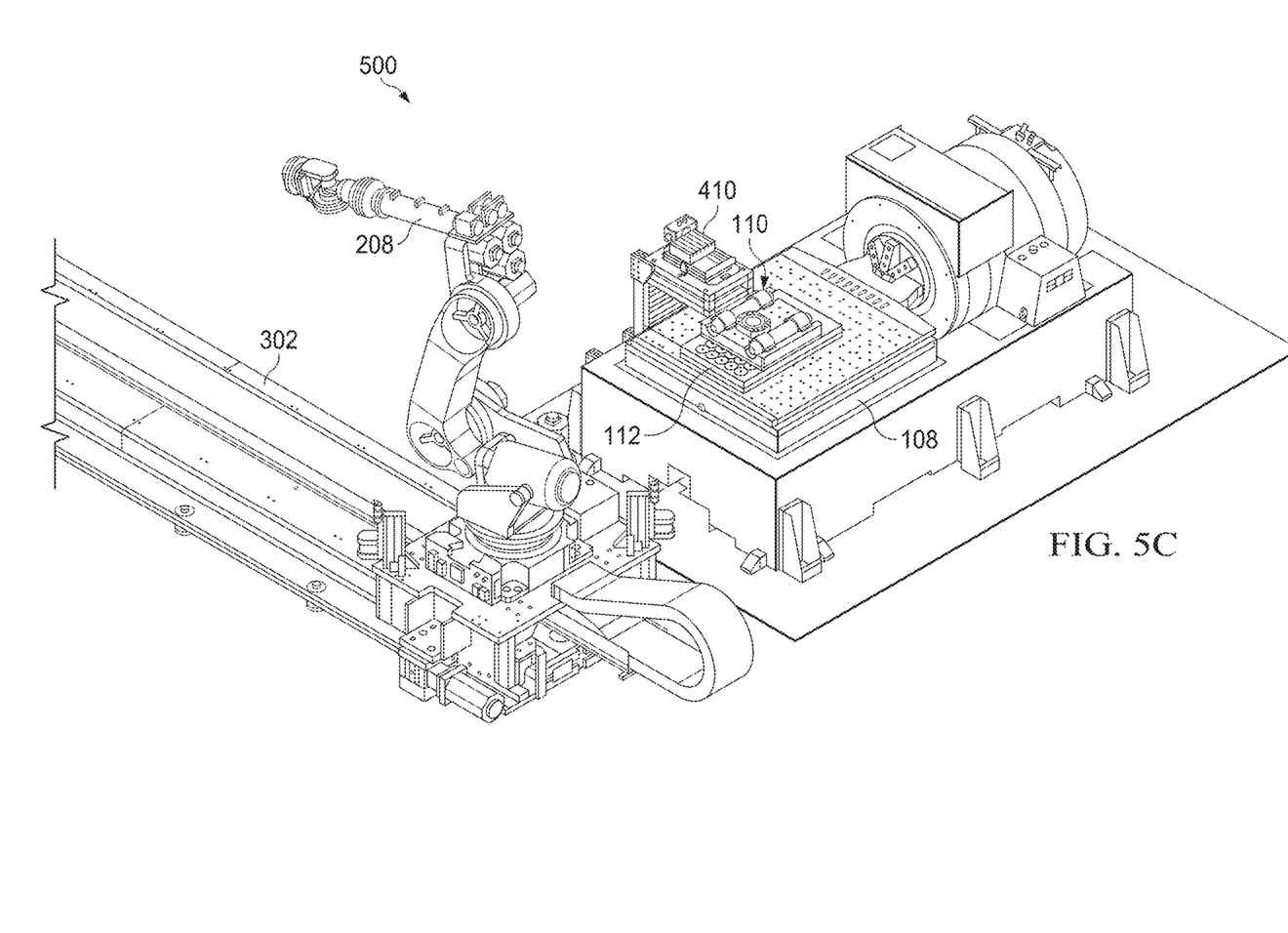

FIGS. 5A through 5C illustrate a second specific example of an automated vibration test system 500 in accordance with this disclosure. The automated vibration test system 500 here uses the test fixture 110 shown in FIG. 4 with the vibration test system 100 of FIG. 1. As shown in FIG. 5A, the automated vibration test system 500 includes the material handling robot 208, which can be used to (among other things) pick up a test fixture 110 and place the test fixture 110 onto the electromagnet 112 attached to the slip table 108. The material handling robot 208 here moves along the track 302, and the vibration test system 100 could be located within the sound abatement enclosure 304 in the automated vibration test system 500 (although the sound abatement enclosure 304 is not shown here for convenience).

In FIG. 5A, the material handling robot 208 is holding the test fixture 110. Prior to placing the test fixture 110 on the slip table 108, the magnetic field from the electromagnet 112 can be substantially or completely neutralized (such as via the application of an electrical current) so that the test fixture 110 can be placed into a suitable position. In FIG. 5B, the material handling robot 208 is placing the test fixture 110 onto the slip table 108. Once in place, the magnetic field from the electromagnet 112 can be reactivated (such as via the removal of an electrical current) so that the test fixture 110 is held tightly in place. The material handling robot 208 can also be used to couple the connector interface 410 to the interconnect 308. As shown in FIG. 5C, the material handling robot 208 has moved away from the vibration test system 100, and the test fixture 110 is locked in place via the use of the electromagnet 112.

Note that in the various embodiments described above, the electromagnet 112 may secure itself to any magnetically-attracted material attached to or forming a part of the slip table 108, or the electromagnet 112 may be secured to the slip table 108 with minimal means. For example, the electromagnet 112 (particularly when implemented using a permanent electromagnet) can apply significant clamping force to the test fixture 110 on top of the electromagnet 112 as well as to the underlying magnetically-attracted material(s) attached to or forming a part of the slip table 108. As a particular example, in some embodiments, approximately 30% of the total top clamping force available from a permanent electromagnet could be used on the bottom of the permanent electromagnet to secure the permanent electromagnet to any magnetically-attracted material attached to or forming a part of slip table 108. Note, however, that it is also possible to use more significant means to secure the electromagnet 112 to the slip table 108 (such as the installation of bolts).

Although FIG. 4 illustrates a second specific example of a test fixture 110 for use with an automated vibration test system, various changes may be made to FIG. 4. For example, the size, shape, and dimensions of the test fixture 110 are for illustration only. In addition, various components could be omitted from or added to the test fixture 110 to provide needed or desired functionality. Although FIGS. 5A through 5C illustrate a second specific example of an automated vibration test system 500, various changes may be made to FIGS. 5A through 5C. For instance, the vibration test system 100 and the associated test fixture 110 could be used with any other suitable robotic or other automated machinery.

Figure 6:
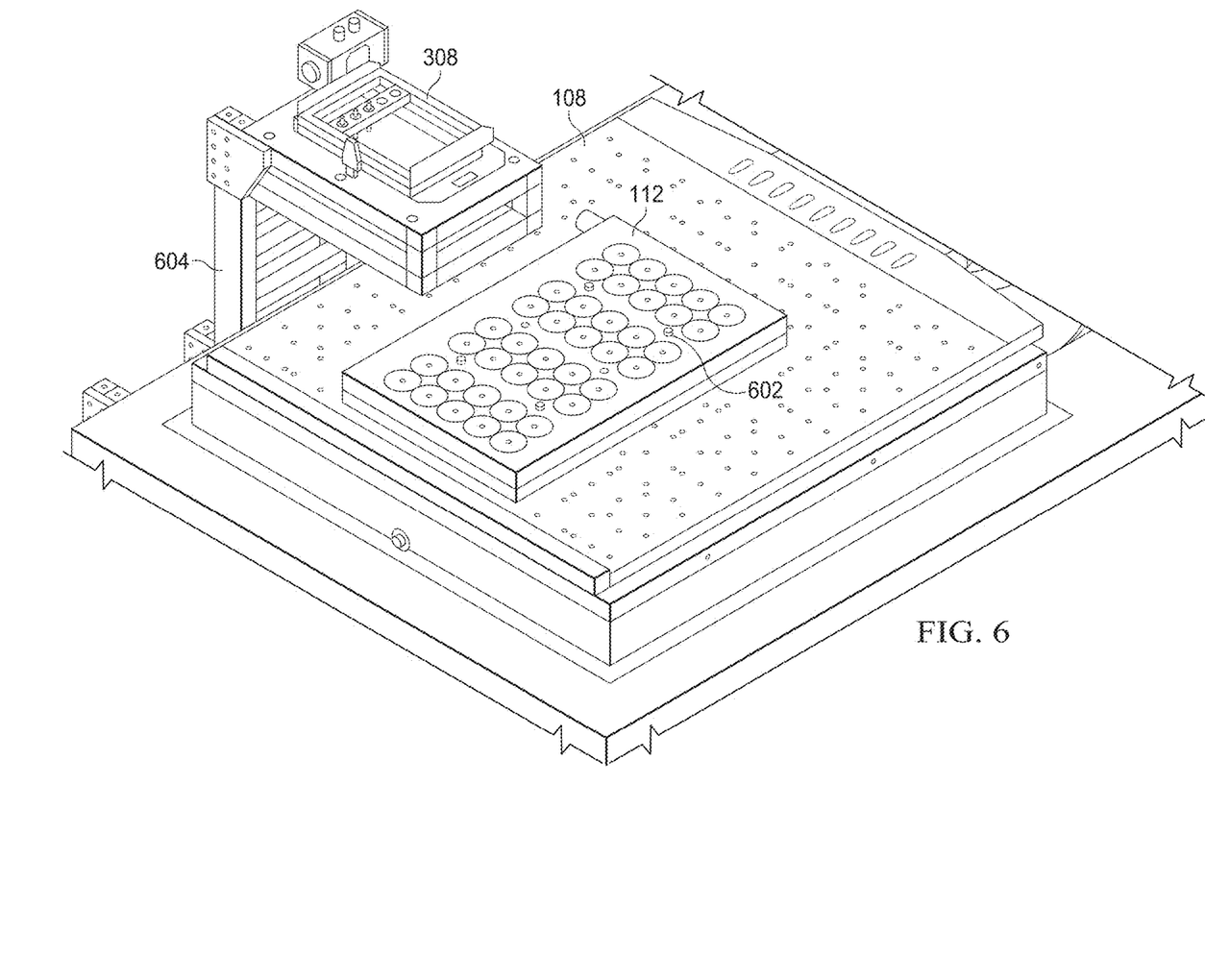
FIG. 6 illustrates additional details of an example automated vibration test system in accordance with this disclosure.

FIG. 6 illustrates additional details of an example automated vibration test system in accordance with this disclosure. More specifically, FIG. 6 illustrates how the top surface of the electromagnet 112 could include one or more shear pins 602. The shear pins 602 denote upwardly extending projections that can mate with recesses in the bottom surface of a test fixture 110. For instance, the plate 210 or 408 of the test fixture 110 could include recesses configured to receive the shear pins 602. The shear pins 602 form a secondary safety feature that helps to restrain horizontal motion of the test fixture 110 in the event of a failure of the electromagnet 112. Each shear pin 602 could have any suitable size, shape, and dimensions, and shear pins 602 having any suitable pattern or arrangement could be used.

FIG. 6 also illustrates additional details regarding the interconnect 308. As can be seen here, the interconnect 308 resides on a support 604. The support 604 may be mounted on the support structure 104 or on other portions of the vibration test system 100 except the slip table 108 itself. One or more cables from the interconnect 308 can pass through or along the support 604 to external devices or systems. The interconnect 308 could be designed to accept a single type of connector module or interface; it also could accept a number of different connector modules or interfaces.

Although FIG. 6 illustrates additional details of one example of an automated vibration test system, various changes may be made to FIG. 6. For example, other types of structures could be used to restrain movement of a test fixture 110, or the shear pins 602 could be omitted. As another example, any other suitable interconnect 308 or support 604 could be used.

Figure 7:
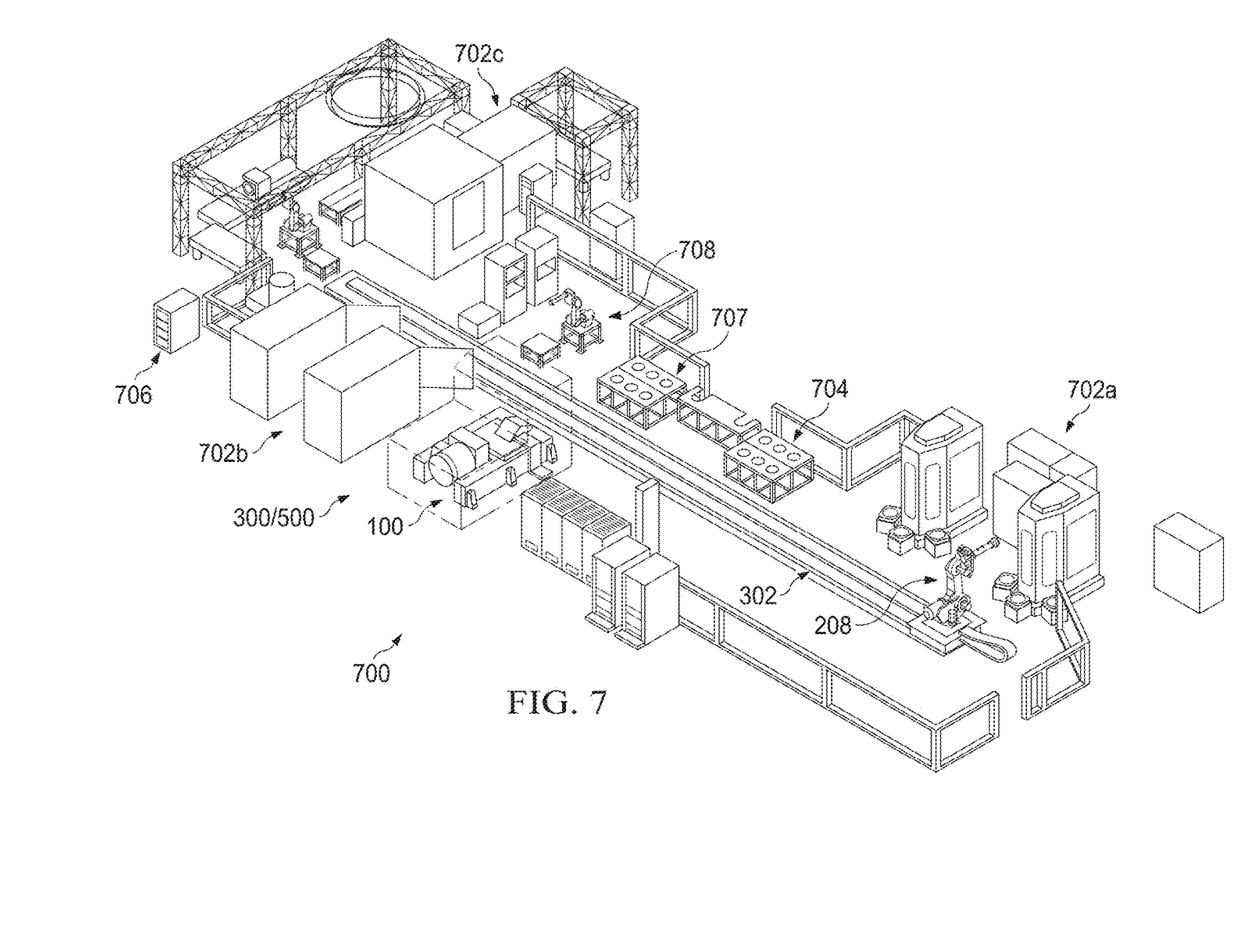
FIG. 7 illustrates an example automated multi-station testing system including an automated vibration test system in accordance with this disclosure.

FIG. 7 illustrates an example automated multi-station testing system 700 including an automated vibration test system in accordance with this disclosure. As shown in FIG. 7, the testing system 700 includes the material handling robot 208, which moves along the track 302. The material handling robot 208 operates to move a number of articles being tested to and from multiple testing stations 702a-702c, as well as to and from the automated vibration test system 300 or 500. The automated vibration test system 300 or 500 includes the vibration test system 100. The other testing stations 702a-702c could perform wide varieties of other tests to the articles. The track 302 could be lengthy (such as 60 feet or more), and any number(s) and type(s) of testing stations could be used to test the articles.

Test fixtures 110 with or without attached articles can be retrieved by the material handling robot 208 from one or more storage racks 704. In some embodiments, each test fixture 110 or attached article can be provided with a "license plate" or other marker. The marker could be physical (such as a bar code) or electronic (such as an RED transmitter or other chip). Prior to or during retrieval of a test fixture 110 from a storage rack 704, the marker or information from the marker associated with the test fixture 110 or article is identified and provided to a control system 706. For instance, the material handling robot 208 could include a scanner that obtains information from the marker and a transmitter that provides the information to the control system 706. In another instance, the test fixture 110 could be identified when placed on different storage racks 704 or testing stations 702a-702c connected to the control system 706. The control system 706 can use the marker or the related information to identify the test(s) to be performed on an article carried by the test fixture 110. The control system 706 can also cause the material handling robot 208 to move the test fixture 110 to other appropriate testing station(s) 702a-702c in addition to the automated vibration test system 300 or 500. The material handling robot 208 can also deliver the test fixture 110 with the article to a transfer station or another storage rack 707 for intended use by a separate test robot 708. Once all testing of the article is completed, the material handling robot 208 can return the test fixture 110 to the designated storage rack 704. Personnel can then manually remove the test fixture 110 from the multi-station testing system 700 and remove the article for post processing, higher assembly, or packaging (although this could also be automated).

The control system 706 could control any suitable aspect(s) of the multi-station testing system 700. As a particular example, the control system 706 could control the operation of the electromagnet 112 to thereby control whether a test fixture 110 can be removed from the vibration test system 100. The control system 706 can also control the operation of the vibration test system 100 to create a desired type or pattern of vibrations and use feedback from the accelerometers 212 to verify whether the vibration test system 100 is creating suitable vibrations.

The control system 706 includes any suitable structure for controlling one or more aspects of a testing system. For example, the control system 706 could include a computing device having one or more processing devices, one or more memories, and one or more interfaces. Each processing device could include a microprocessor, microcontroller, digital signal processor (DSP), field programmable gate array (FPGA), application specific integrated circuit (ASIC), or discrete logic. Each memory could represent a volatile or non-volatile storage and retrieval device, such as a random access memory or Flash memory. Each interface could represent an Ethernet interface, radio frequency (RF) interface, or other interface configured to transmit and receive information.

Although FIG. 7 illustrates one example of an automated multi-station testing system 700 including an automated vibration test system 300 or 500, various changes may be made to FIG. 7. For example, an automated multi-station testing system could include any number of material handling robots, testing stations, storage racks, vibration test systems, and other components. In general, there are wide varieties of automated systems in which one or more vibration test systems could be used, and FIG. 7 does not limit this disclosure to any single automated testing system.

Figure 8:
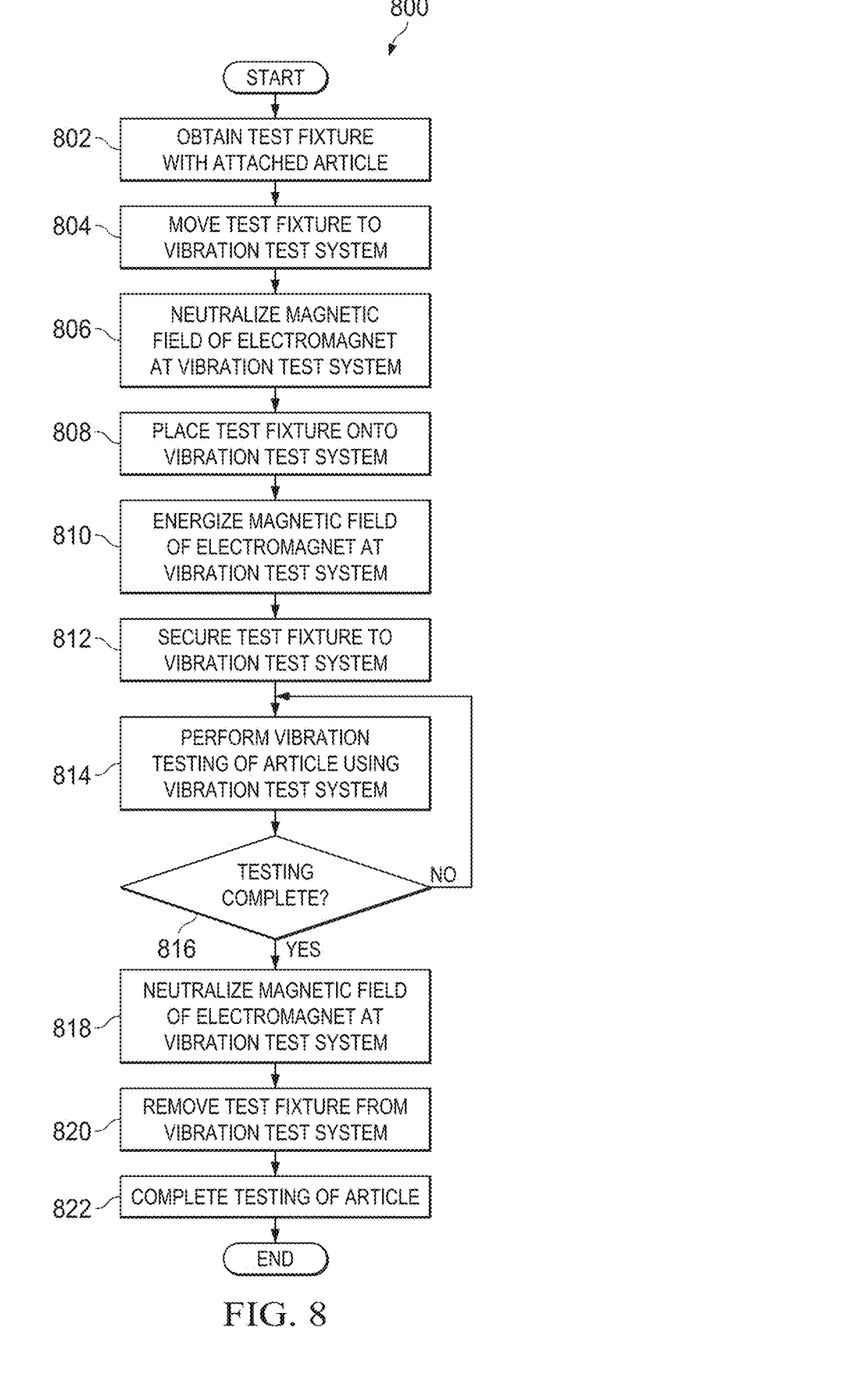
FIG. 8 illustrates an example method for automated vibration testing in accordance with this disclosure.

FIG. 8 illustrates an example method 800 for automated vibration testing in accordance with this disclosure. For ease of explanation, the method 800 is described with respect to the vibration test system 100 of FIG. 1 and the test fixture 110 of FIG. 2 or FIG. 4. However, the method 800 could be used with any other suitable device or with any other suitable test fixture.

As shown in FIG. 8, a test fixture with at least one attached article is obtained at step 802. This could include, for example, a material handling robot 208 or other structure obtaining a test fixture 110 holding at least one article in its clamping ring 204 or housing 402. Any suitable number(s) and type(s) of articles could be held by the test fixture 110. The test fixture 110 could be obtained from any suitable location(s), such as one or more storage racks 704.

The test fixture is moved to a vibration test system at step 804. This could include, for example, the material handling robot 208 or other structure moving along the track 302 to deliver the test fixture 110 to a testing station that includes the vibration test system 100.

A magnetic field of an electromagnet at the vibration test system is neutralized at step 806. This could include, for example, applying an electrical current to a permanent electromagnet 112 in order to substantially reduce or eliminate the magnetic field. As noted above, however, a non-permanent electromagnet 112 could also be used. The test fixture is placed on the vibration test system at step 808. This could include, for example, the material handling robot 208 or other structure placing the test fixture on the electromagnet 112. Various safety checks could occur prior to placing the test fixture on the electromagnet 112, such as ensuring that the electromagnet 112 is clear of other structures. The magnetic field of the electromagnet at the vibration test system is energized at step 810. This could include, for example, removing the electrical current from the permanent electromagnet 112 in order to recreate the magnetic field of the permanent electromagnet. This secures the test fixture to the vibration test system at step 812.

Vibration testing of the article is performed using the vibration test system at step 814. This could include, for example, the electrodynamic shaker 106 of the vibration test system 100 causing the slip table 108 to impart vibrations to the test fixture 110. This could also include the control system 706 or other vibration control systems to use feedback from the accelerometers 212 to adjust the operation of the vibration test system 100. A determination is made whether testing of the article is complete at step 816. This could include, for example, the control system 706 determining whether adequate amount(s) and type(s) of vibrations have been applied to the article during the testing. If not, the process returns to step 814 to continue the testing, or the test fixture 110 with the article(s) is removed and placed on a storage rack 704 until further action by the control system 706 takes place.

If the vibration testing is complete, the magnetic field of the electromagnet at the vibration test system is neutralized at step 818. This could include, for example, applying electrical current to the permanent electromagnet 112 in order to substantially reduce or eliminate the magnetic field from the permanent electromagnet 112. The test fixture is removed from the vibration test system at step 820. This could include, for example, the material handling robot 208 or other structure lifting the test fixture off the electromagnet 112. Testing of the article is completed at step 822. This could include, for example, the material handling robot 208 or other structure delivering the test fixture 110 to one or more other testing stations for other types of testing. This could also include the test fixture 110 being delivered to the storage rack 704 by the material handling robot 208. This process could be repeated for any number of test fixtures 110 with articles attached.

Although FIG. 8 illustrates one example of a method 800 for automated vibration testing, various changes may be made to FIG. 8. For example, while shown as a series of steps, various steps in FIG. 8 could overlap, occur in parallel, occur in a different order, or occur any number of times. Also, while not shown, the same test fixture 110 could be repositioned one or more times during the vibration testing in order to induce vibrations along multiple axes of the article(s) under test. This repositioning of the same test fixture 110 could include the process of neutralizing the magnetic field of the electromagnet 112, repositioning the test fixture 110, and energizing the magnetic field of the electromagnet 112.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a vibration test system comprising a slip table, the vibration test system configured to vibrate the slip table, the slip table comprising an electromagnet; and
a test fixture configured to receive at least one article to be subjected to vibration testing, at least part of the test fixture configured to be magnetically attracted to the electromagnet in order to secure the test fixture to the electromagnet.

2. The system of claim 1, wherein the electromagnet comprises a permanent electromagnet configured to generate a magnetic field unless the magnetic field is substantially or completely neutralized via application of an electrical current to the permanent electromagnet.

3. The system of claim 2, wherein the permanent electromagnet is configured such that the magnetic field secures the permanent electromagnet to (i) a magnetically-attracted material affixed to the slip table or (ii) the slip table.

4. The system of claim 1, wherein the test fixture comprises a metal plate that is magnetically attracted to the electromagnet.

5. The system of claim 1, wherein the test fixture comprises at least one of a clamping ring and a housing configured to receive and secure the at least one article.

6. The system of claim 1, wherein:
the vibration test system further comprises an interconnect configured to provide signals or media to or from the test fixture; and
the test fixture further comprises a connector or interface configured to be coupled to the interconnect.

7. The system of claim 1, wherein the test fixture further comprises at least one accelerometer configured to measure vibrations of the test fixture.

8. The system of claim 1, further comprising:
a material handling robot configured to lift and move the test fixture.

9. The system of claim 8, further comprising:
multiple testing stations configured to perform tests on the at least one article;
wherein the material handling robot is configured to move the test fixture to and from each of the testing stations.

10. The system of claim 9, further comprising:
a control system configured to (i) identify the test fixture or the at least one article and (ii) control the material handling robot to move the test fixture to one or more of the testing stations based on the identification.

11. A method comprising:
providing a test fixture to a vibration test system;
securing the test fixture to a slip table of the vibration test system using a magnetic field generated by an electromagnet of the vibration test system; and
performing a vibration test of at least one article secured to the test fixture, the vibration test system imparting vibrations to the slip table to thereby impart vibrations to the test fixture and the at least one article.

12. The method of claim 11, wherein the electromagnet comprises a permanent electromagnet.

13. The method of claim 12, wherein the magnetic field secures the permanent electromagnet to (i) a magnetically-attracted material affixed to the slip table or (ii) the slip table.

14. The method of claim 12, wherein securing the test fixture to the slip table comprises:
applying an electrical current to the permanent electromagnet to substantially or completely neutralize the magnetic field;
placing the test fixture on the permanent electromagnet after the magnetic field is substantially or completely neutralized; and
removing the electrical current from the permanent electromagnet to recreate the magnetic field and secure the test fixture to the permanent electromagnet.

15. The method of claim 11, wherein:
the vibration test system comprises an interconnect configured to provide signals or media to or from the test fixture;
the test fixture comprises a connector or interface; and
the method further comprises coupling the connector or interface to the interconnect prior to the vibration test.

16. The method of claim 11, further comprising:
adjusting operation of the vibration test system based on measurements from at least one accelerometer of the test fixture.

17. A vibration test system comprising:
an electrodynamic shaker and a slip table, the electrodynamic shaker configured to vibrate the slip table, the slip table configured to impart vibrations to a test fixture that is secured to the slip table;
wherein the slip table comprises an electromagnet configured to generate a magnetic field in order to secure the test fixture to the slip table.

18. The vibration test system of claim 17, wherein the electromagnet comprises a permanent electromagnet configured to generate the magnetic field until the magnetic field is substantially or completely neutralized via application of an electrical current to the permanent electromagnet.

19. The vibration test system of claim 18, wherein the permanent electromagnet is configured such that the magnetic field secures the permanent electromagnet to (i) a magnetically-attracted material affixed to the slip table or (ii) the slip table.

20. The vibration test system of claim 17, further comprising:
   an interconnect configured to provide signals or media to or from the test fixture, the interconnect configured to be coupled to a connector or interface of the test fixture.

21. The vibration test system of claim 20, wherein the interconnect is configured to at least one of:
   provide power to the test fixture or the at least one article;
   provide electrical signals to the test fixture or the at least one article;
   provide air to the test fixture or the at least one article; and
   receive electrical signals from the test fixture or the at least one article.

* * * * *